US012410050B2

(12) United States Patent
Jin

(10) Patent No.: US 12,410,050 B2
(45) Date of Patent: Sep. 9, 2025

(54) DUMPING-TYPE AUTONOMOUS QUANTITATIVE LIQUID DISCHARGING DEVICE AND QUANTITATIVE LIQUID DISCHARGING METHOD THEREOF

(71) Applicant: Changdao Jin, Ningbo (CN)

(72) Inventor: Changdao Jin, Ningbo (CN)

( * ) Notice: Subject to any disclaimer, the term of this patent is extended or adjusted under 35 U.S.C. 154(b) by 176 days.

(21) Appl. No.: 18/527,422

(22) Filed: Dec. 4, 2023

(65) Prior Publication Data

US 2025/0178881 A1 Jun. 5, 2025

(51) Int. Cl.

| | |
|---|---|
| ***B67D 3/00*** | (2006.01) |
| ***A47G 19/18*** | (2006.01) |
| ***B65D 25/28*** | (2006.01) |
| ***B65D 47/24*** | (2006.01) |
| ***B65D 47/32*** | (2006.01) |

(52) U.S. Cl.

CPC ........... *B67D 3/0045* (2013.01); *A47G 19/18* (2013.01); *B65D 25/2811* (2013.01); *B65D 47/245* (2013.01); *B65D 47/32* (2013.01); *B67D 3/0051* (2013.01)

(58) Field of Classification Search

CPC ...... B65D 47/26; B65D 47/32; B65D 47/245; B67D 3/0041; B67D 3/0045; B67D 3/0051; A47G 19/18

USPC ...................................................... 222/36, 56

See application file for complete search history.

(56) References Cited

U.S. PATENT DOCUMENTS 6,409,046 B1 * 6/2002 Peckels ................ B67D 3/0077 222/37
8,985,406 B2 * 3/2015 Tachi ..................... B65D 59/02 222/472
9,359,183 B2 * 6/2016 Henderson ........... B67D 3/0051
12,110,157 B2 * 10/2024 Tu ........................ B65D 51/242

FOREIGN PATENT DOCUMENTS

WO WO-2020006600 A1 * 1/2020 ........... B67D 3/0045

* cited by examiner

*Primary Examiner* — Timothy L Maust
(74) *Attorney, Agent, or Firm* — Jose Cherson Weissbrot

(57) ABSTRACT

The present invention relates to a dumping-type automatic quantitative liquid discharging device, which comprises an accommodating cavity for accommodating liquid, a first liquid storage cavity and a second liquid storage cavity for storing quantitative liquid, and a fluid channel; the second liquid storage cavity further comprises a liquid storage part; the liquid storage part captures and stores a part of liquid to become a new quantitative liquid; when the device is reset, the quantitative liquid stored in the second liquid storage cavity will be received and stored by the first liquid storage cavity; and a quantitative liquid discharging method, which comprises the following steps: providing a dumping-type automatic quantitative liquid discharging device, and pouring the liquid into an accommodating cavity; connecting a device cover with the accommodating cavity; tilting the dumping-type automatic quantitative liquid discharging device to allow quantitative liquid to flow out.

20 Claims, 9 Drawing Sheets

DUMPING-TYPE AUTONOMOUS QUANTITATIVE LIQUID DISCHARGING DEVICE AND QUANTITATIVE LIQUID DISCHARGING METHOD THEREOF

TECHNICAL FIELD

The present invention relates to the technical field of kitchen utensils, in particular to a dumping-type automatic quantitative liquid discharging device and a quantitative liquid discharging method thereof.

BACKGROUND

Container devices are indispensable items in human life. They can store, transport, protect and display various substances to meet people's various needs. The types and materials of devices are very rich, including metal, plastic, glass, ceramics, paper and so on.

However, the existing container devices in the market generally have the problem that it is difficult to control the liquid output. The unstable liquid output will lead to the inaccurate liquid quantity filled or transported, which will affect the consistency and efficiency of products. It leads to waste or shortage of liquid, which affects the quality and cost of products. For example, a container device disclosed in U.S. Patent No. 20230278761 has the problem that it is difficult to control the liquid output; Similarly, the U.S. patent with the application Ser. No. 13/907,526 also has unstable liquid discharging.

Therefore, it is necessary for us to put forward a dumping-type automatic quantitative liquid discharging device, which has stable liquid outlet, stable structure and convenient use, and can provide users with the choice of devices with stable liquid outlet and obtain quantitative liquid more conveniently.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a dumping-type automatic quantitative liquid discharging device, which includes: an accommodating cavity for accommodating liquid, a first liquid storage cavity and a second liquid storage cavity for storing quantitative liquid, and a fluid channel;

wherein, said fluid channel sequentially communicates with said accommodating cavity, said first liquid storage cavity and said second liquid storage cavity, and defines a path for air and said quantitative liquid to enter and leave said device; and wherein, said first liquid storage cavity and said second liquid storage cavity are arranged at one end of said accommodating cavity; when said device pours out liquid, the quantitative liquid stored in said second liquid storage cavity leaves said device through said fluid channel, and an atmospheric low pressure area is formed at the other end of said accommodating cavity; and an atmospheric normal pressure area is formed in said first liquid storage cavity and said second liquid storage cavity, so that said liquid is confined between said first liquid storage cavity and said accommodating cavity; and wherein said second liquid storage cavity captures and stores a part of said liquid to become new said quantitative liquid; and wherein, when said device is reset, said quantitative liquid stored in said second liquid storage cavity will be received and stored by said first liquid storage cavity.

The present invention also provides a dumping-type automatic quantitative liquid discharging device, which includes an accommodating cavity for accommodating liquid, a first liquid storage cavity and a second liquid storage cavity for storing quantitative liquid, and a fluid channel;

wherein, said fluid channel sequentially communicates with said accommodating cavity, said first liquid storage cavity and said second liquid storage cavity, and defines a path for air and said quantitative liquid to enter and leave said device; and wherein a sum of volumes of said first liquid storage cavity and said second liquid storage cavity is smaller than a volume of said accommodating cavity, and said second liquid storage cavity further comprises a liquid storage part; and wherein, said first liquid storage cavity and said second liquid storage cavity are arranged at one end of said accommodating cavity; when said device pours out liquid, said quantitative liquid stored in said second liquid storage cavity leaves said device through said fluid channel; and an atmospheric low pressure area is formed at the other end of said accommodating cavity, and an atmospheric normal pressure area is formed in said first liquid storage cavity and said second liquid storage cavity, so that said liquid is confined between said first liquid storage cavity and said accommodating cavity; and wherein said liquid storage part captures and stores a part of said liquid to become new said quantitative liquid; and wherein, when said device is reset, said quantitative liquid stored in said second liquid storage cavity will be received and stored by said first liquid storage cavity.

The present invention also provides a quantitative liquid discharging method, which includes providing a dumping-type automatic quantitative liquid discharging device, wherein dumping-type automatic quantitative liquid discharging device comprises an accommodating cavity for accommodating liquid, a first liquid storage cavity and a second liquid storage cavity for storing quantitative liquid, and a fluid channel;

wherein, said fluid channel sequentially communicates with said accommodating cavity, said first liquid storage cavity and said second liquid storage cavity, and defines a path for air and said quantitative liquid to enter and leave said device; and wherein, said first liquid storage cavity and said second liquid storage cavity are arranged at one end of said accommodating cavity; when said device pours out liquid, the quantitative liquid stored in said second liquid storage cavity leaves said device through said fluid channel, and an atmospheric low pressure area is formed at the other end of said accommodating cavity; and an atmospheric normal pressure area is formed in said first liquid storage cavity and said second liquid storage cavity, so that said liquid is confined between said first liquid storage cavity and said accommodating cavity; and wherein said second liquid storage cavity captures and stores a part of said liquid to become new said quantitative liquid; and wherein, when said device is reset, said quantitative liquid stored in said second liquid storage cavity will be received and stored by said first liquid storage cavity; and pouring liquid into said accommodating cavity; and connecting said device cover with said accommodating cavity; and tilting said dumping-type automatic quantitative liquid discharging device to allow the quantitative liquid to flow out.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
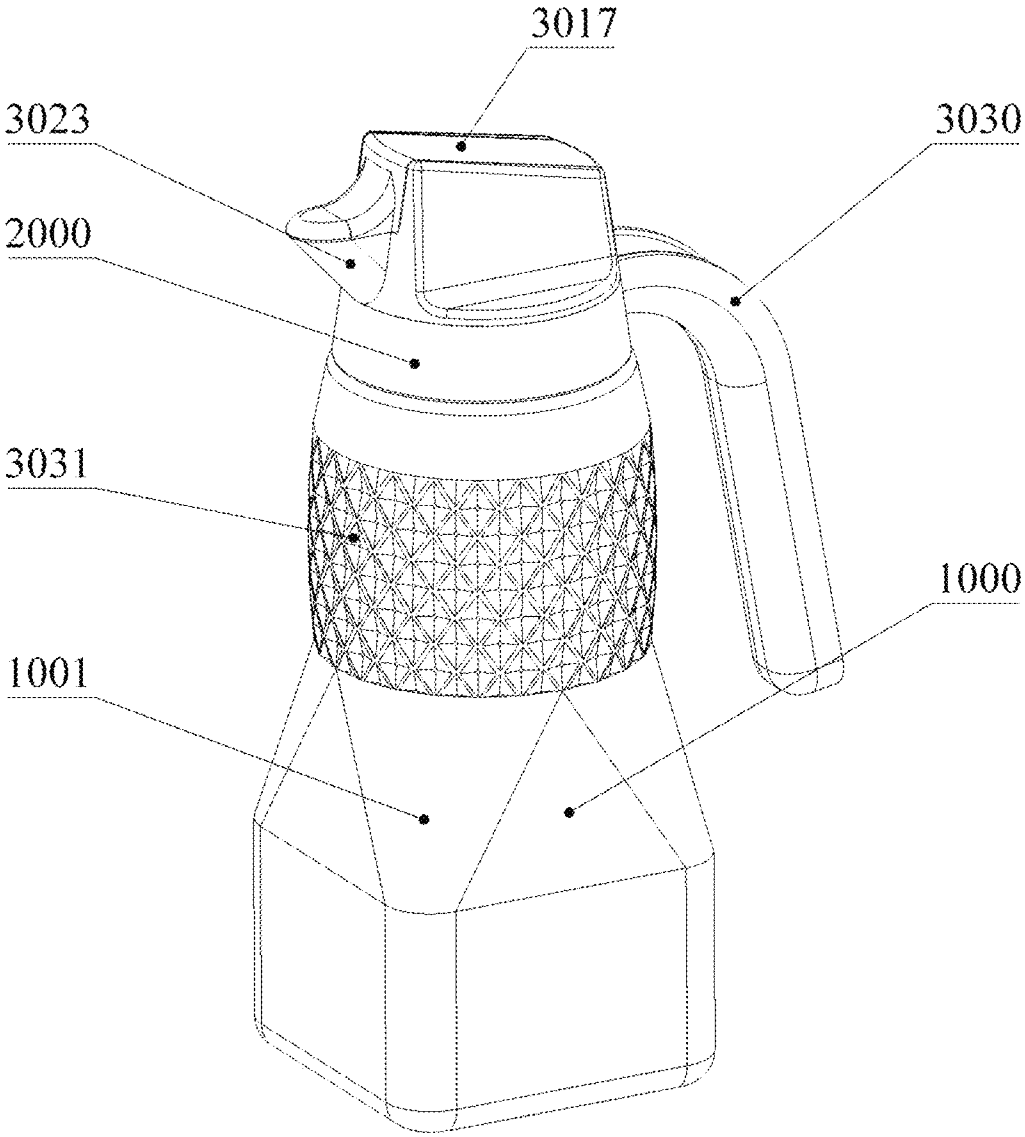
FIG. 1 is a schematic diagram of a dumping-type automatic quantitative liquid discharging device.

1000, Device; 1001, Accommodating cavity; 1002, Bottom groove; 2000, Device cover; 2001, Fluid channel; 2002, Liquid outlet; 3002, First liquid storage cavity; 3003, Second liquid storage cavity; 3004, Liquid inlet hole; 3005, Liquid storage cavity; 3006, Liquid storage outlet; 3007, First valve body; 3008, First sealing ring; 3009, Sealing opening; 3010, Embedding groove; 3011, First clamping groove; 3012, First clamping block; 3013, Liquid retaining ring; 3014, Liquid retaining part; 3015, Clamping ring; 3016, Ring groove; 3017, Top cover; 3018, Rotating column; 3019, Rotating groove; 3020, Weight block; 3021, Accommodating part; 3022, Liquid outlet nozzle; 3023, Cover nozzle; 3024, First fixing groove; 3025, Second fixing groove; 3026, Fixing ring; 3027, Air inlet pipe; 3028, Second clamping block; 3029, Second clamping groove; 3030, Handle part; 3031, Anti-skid lines; 3032, Limiting edge; 3033, External thread; 3034, Internal thread; 3035, Second sealing ring; 3036, Sealing groove; 3037, Liquid storage; 3038, Air outlet hole; 4000, Second valve body;

A, Liquid; B, Quantitative liquid; C, Atmospheric low pressure area; D, Atmospheric normal pressure area.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or laver, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 9, the present invention provides a dumping-type automatic quantitative liquid discharging device, which includes an accommodating cavity 1001 for accommodating liquid A, a first liquid storage cavity 3002 and a second liquid storage cavity 3003 for storing quantitative liquid B, and a fluid channel 2001.

The fluid channel 2001 communicates with the accommodating cavity 1001, the first liquid storage cavity 3002 and the second liquid storage cavity 3003 in turn, and defines the path for air and the quantitative liquid B to enter and leave the device 1000.

The sum of the volumes of the first liquid storage cavity 3002 and the second liquid storage cavity 3003 is smaller than the volume of the accommodating cavity 1001, and the second liquid storage cavity 3003 further includes a liquid storage part 3037.

The first liquid storage cavity 3002 and the second liquid storage cavity 3003 are arranged at one end of the accommodating cavity 1001. When the device 1000 pours out liquid, the quantitative liquid B stored in the second liquid storage cavity 3003 leaves the device 1000 through the fluid channel 2001, and an atmospheric low pressure area C is formed at the other end of the accommodating cavity 1001, and an atmospheric normal pressure area D is formed in the first liquid storage cavity 3002 and the second liquid storage cavity 3003.

The liquid storage part 3037 captures and stores a part of the liquid A to become a new quantitative liquid B.

When the device 1000 is reset, the quantitative liquid B stored in the second liquid storage cavity 3003 will be received and stored by the first liquid storage cavity 3002.

Figure 2:
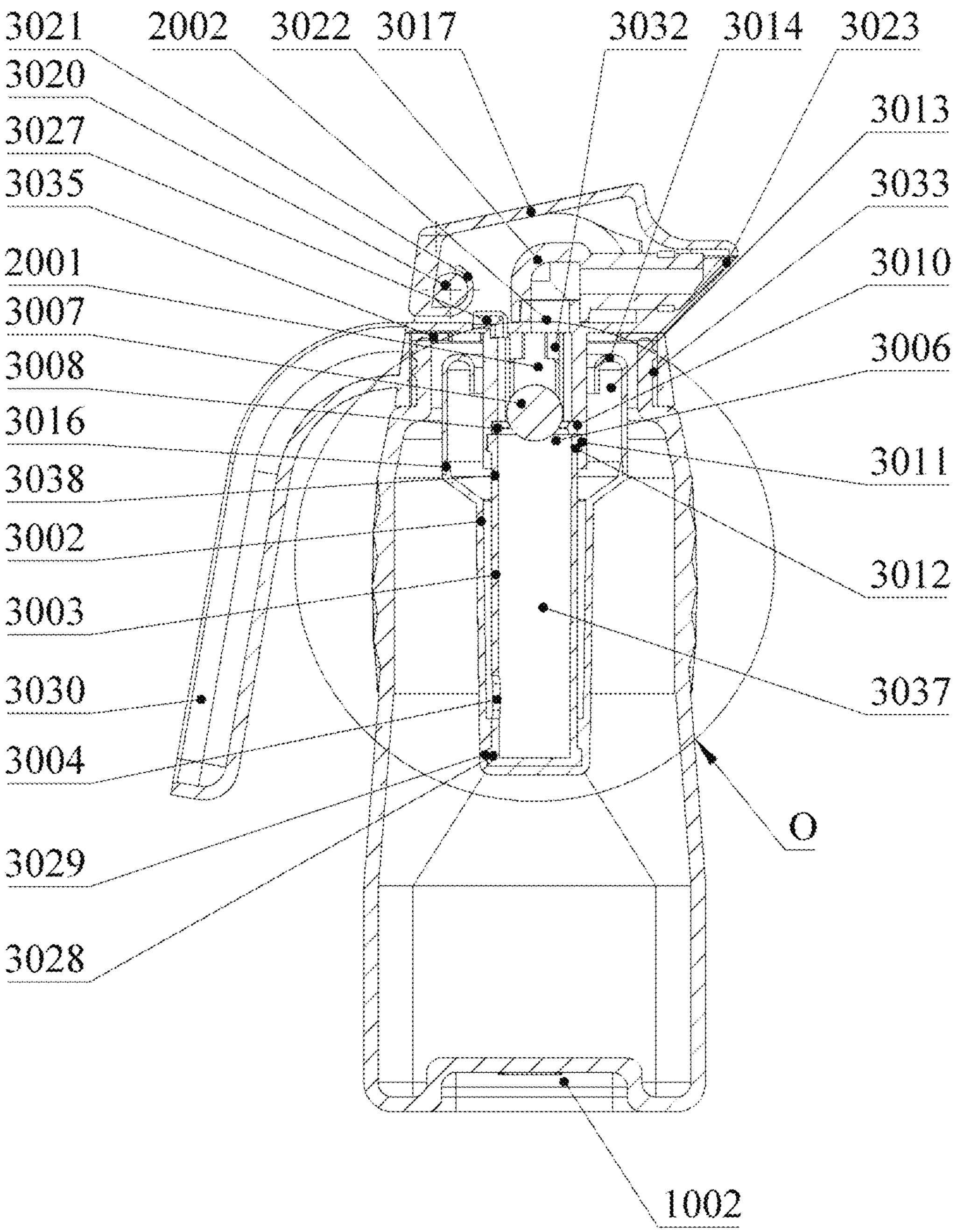
FIG. 2 is an explosion diagram of the dumping-type automatic quantitative liquid discharging device.
Figure 3:
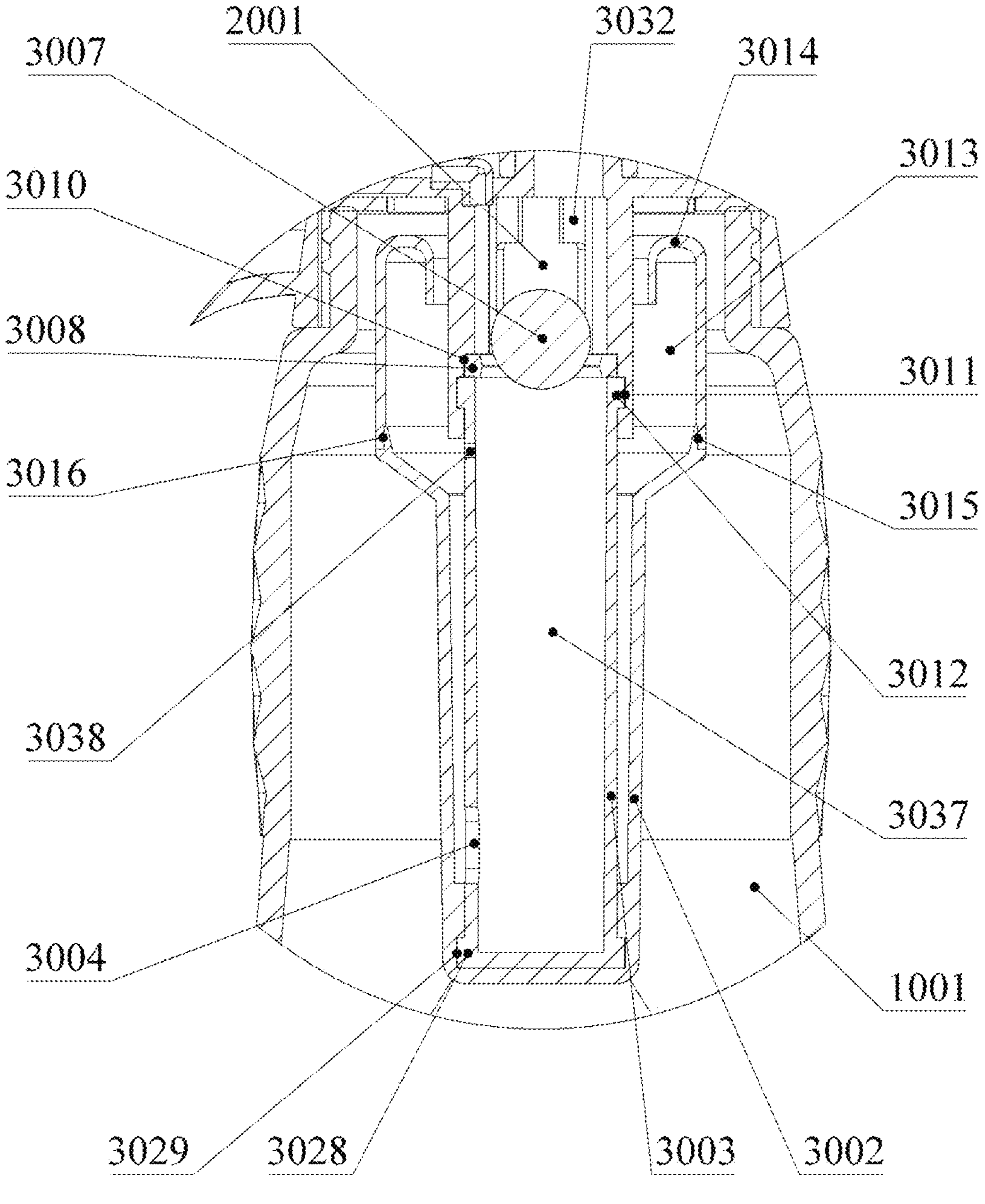
FIG. 3 is an enlarged schematic view at O in FIG. 2.

As shown in FIGS. 2 and 3, in this embodiment, the second liquid storage cavity 3003 is provided with a liquid storage outlet 3006 corresponding to the fluid channel 2001, and a first valve body 3007 corresponding to the liquid storage outlet 3006 is provided in the fluid channel 2001. When the device is in a vertical state, the first valve body 3007 blocks the liquid storage outlet 3006; when the device pours out liquid, the first valve body 3007 is far away from the liquid storage outlet 3006; the liquid storage outlet 3006 is provided with a first sealing ring 3008, and the first sealing ring 3008 is provided with a sealing opening 3009 corresponding to the first valve body 3007. The first valve body 3007 improves the air tightness of the device, and can prevent the liquid in the device from volatilizing and deteriorating.

The second liquid storage cavity 3003 is provided with a liquid inlet hole 3004 for allowing the liquid A to enter the second liquid storage cavity 3003, and an air outlet hole 3038 for discharging the air in the second liquid storage cavity 3003. This design can make the device back to the right time, and the liquid in the liquid storage part 3037 can smoothly enter the second liquid storage cavity 3003.

In this embodiment, the liquid inlet hole 3004 and the air outlet hole 3038 are provided as one. In other embodiments (not shown in the figures), the liquid inlet hole 3004 and the air outlet hole 3038 are not limited to one, but can also be set to two, three, four, five and any desired number.

In this embodiment, the first valve body 3007 is provided as a sphere. In other embodiments (not shown in the figures), the first valve body is not limited to being set as a sphere, but can also be set as a cone, a cylinder, a cube, a cuboid, an ellipsoid and any desired shape.

In this embodiment, the first sealing ring 3008 is made of a rubber material. In other embodiments, the first sealing ring 3008 is not limited to being made of rubber, but can also be made of polytetrafluoroethylene (PTFE), polyurethane (PU), metal and any other desired materials. In some embodiments, the first sealing ring 3008 is not provided between the fluid channel 2001 and the liquid storage outlet 3006 of the second liquid storage cavity 3003, but the fluid channel 2001 or the second liquid storage cavity 3003 is made of the material of the first sealing ring 3008.

Rubber is the most commonly used sealing ring material with good elasticity, softness, wear resistance and chemical resistance. There are many kinds of rubber, and different rubbers have different properties and application scope, such as oil resistance of NBR, high and low temperature resistance of silicone rubber, heat resistance of fluororubber, acid and alkali, etc.

Polytetrafluoroethylene (PTFE), a synthetic polymer material, has very low friction coefficient, high temperature resistance, excellent chemical stability and non-stickiness. PTFE can tolerate a variety of media, such as oil, water, steam, medicine, etc., and is suitable for high temperature, high speed and high pressure sealed environment.

Polyurethane (PU) is a synthetic elastomer material with high strength, hardness, wear resistance and aging resistance. PU can tolerate oil, water, oxygen and oarea, and is suitable for high-pressure and high-speed system sealing in construction machinery and metallurgical equipment.

Metal is a hard sealing ring material with high mechanical strength, heat resistance and corrosion resistance. There are many kinds of metals, and different metals have different properties and scope of application, such as steel, iron, copper and stainless steel. Metal sealing ring is generally used in high pressure, high temperature and high speed sealing environment, or combined with other materials.

As shown in FIGS. 2 and 3, in this embodiment, an embedding groove 3010 is arranged at the bottom of the fluid channel 2001, and the liquid storage outlet 3006 of the second liquid storage cavity 3003 and the first sealing ring 3008 are arranged in the embedding groove 3010; the embedding groove 3010 is provided with a first clamping groove 3011, and the second liquid storage cavity 3003 is provided with a first clamping block 3012 corresponding to the first clamping groove 3011, so that the fluid channel 2001 and the first liquid storage cavity 3002 are detachably connected by clamping.

In this embodiment, the fluid channel 2001 and the first liquid storage cavity 3002 are detachably connected by clamping. In other embodiments (not shown in the figures), the fluid channel and the first liquid storage cavity are not limited to being detachably connected by clamping, but can also be set to be connected by screws, pins, rivets, welding and any desired connection mode.

Figure 4:
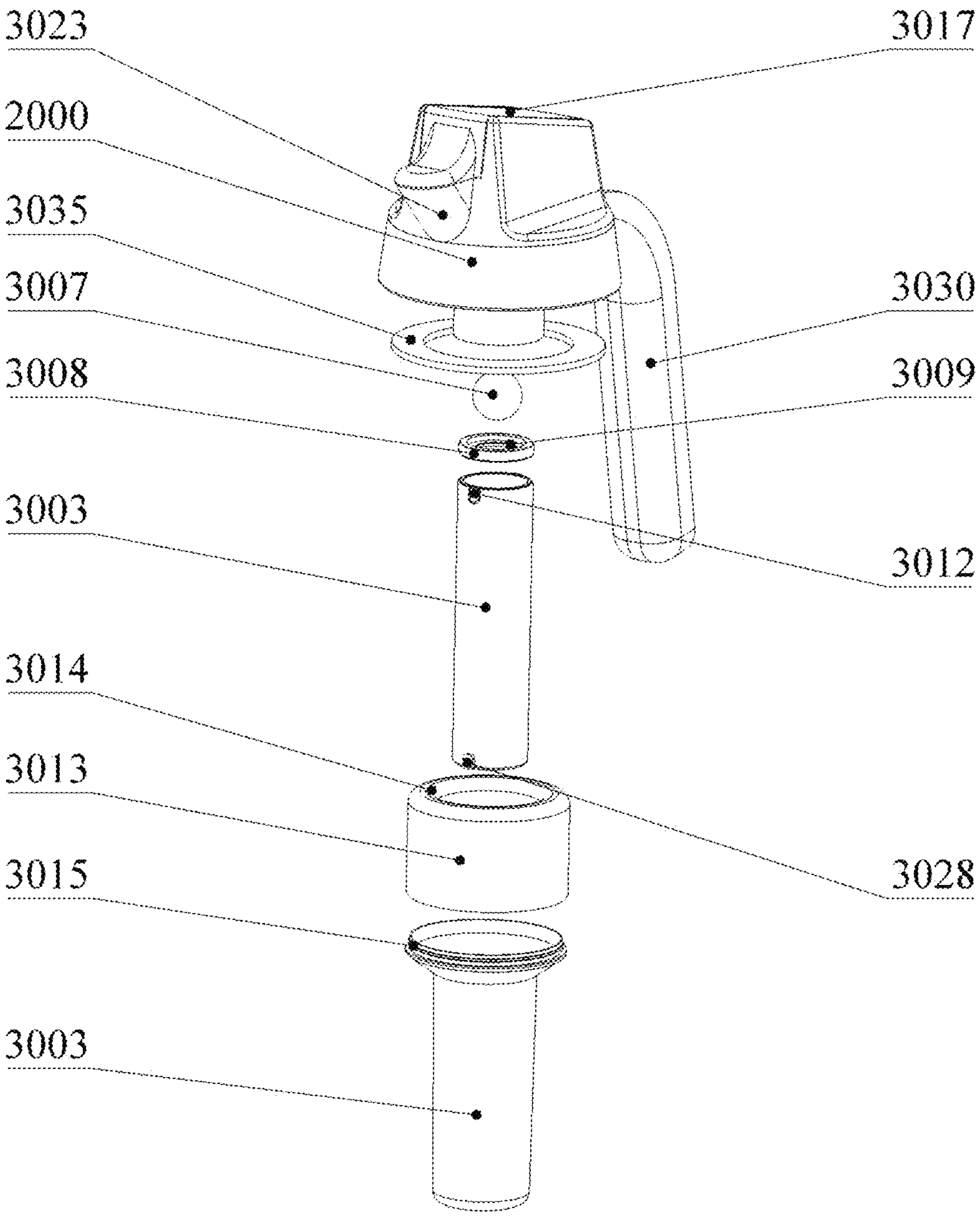
FIG. 4 is an exploded view of the device cover.

As shown in FIGS. 2 to 4, in this embodiment, the first liquid storage cavity 3002 is provided with a liquid retaining ring 3013, and the liquid retaining ring 3013 is formed with a liquid retaining part 3014 bent inward; the first liquid storage cavity 3002 is provided with a clamping ring 3015, and the liquid retaining ring 3013 is provided with a ring groove 3016. The first liquid storage cavity 3002 and the liquid retaining ring 3013 are detachably connected by clamping.

In this embodiment, the first liquid storage cavity 3002 and the liquid retaining ring 3013 are detachably connected by clamping. In other embodiments (not shown in the figures), the first liquid storage cavity and the liquid storage retaining ring are not limited to being detachably connected by clamping, but can also be connected by screws, pins, rivets, welding and any other desirable connection methods.

Figure 5:
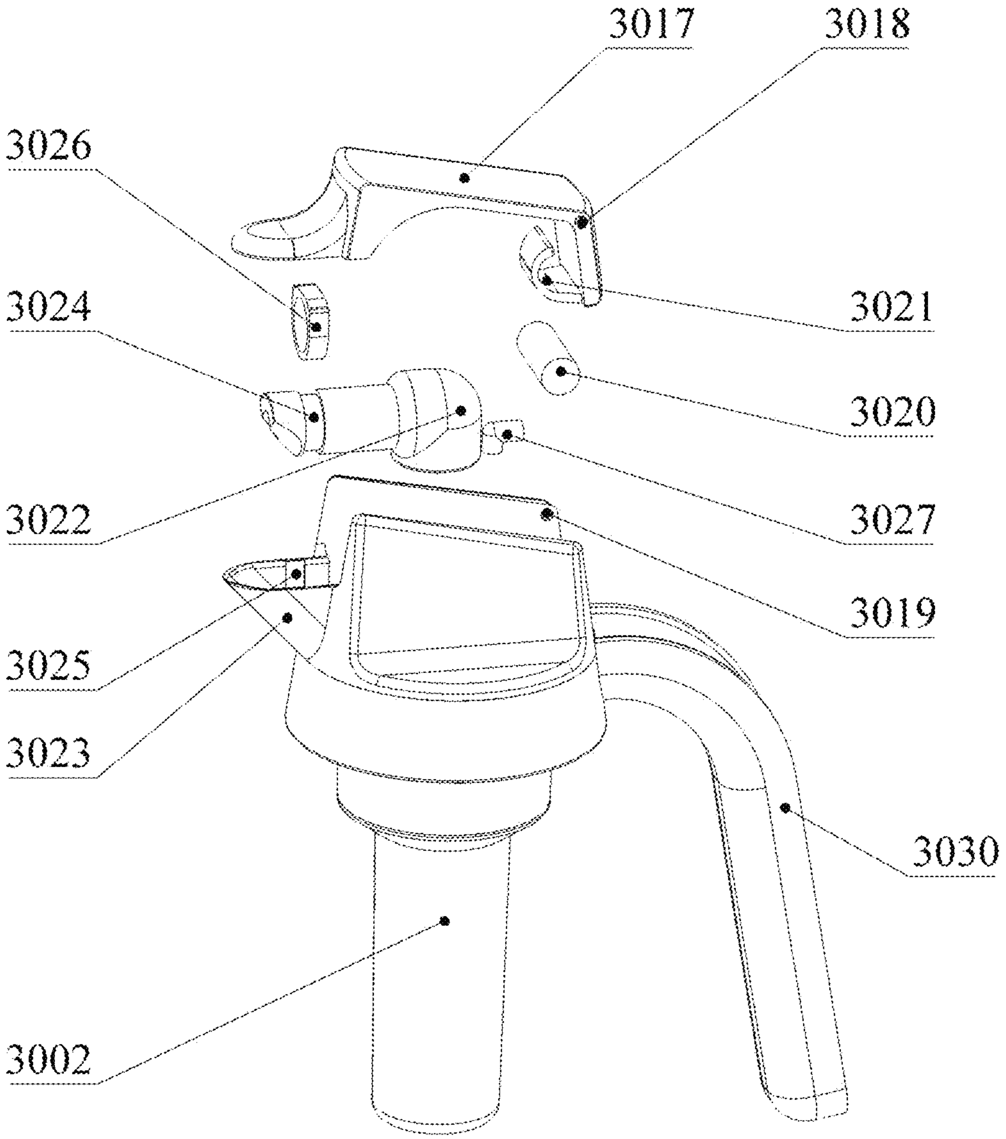
FIG. 5 is another exploded view of the device cover.

As shown in FIG. 5, in this embodiment, a top cover 3017 is provided on the device cover 2000, a rotating column 3018 is provided on the device cover 2000, a rotating groove 3019 corresponding to the rotating column 3018 is provided on the top cover 3017, and the top cover 3017 is rotatably connected with the device cover 2000.

In this embodiment, the top cover 3017 and the device cover 2000 are detachably connected by clamping. In other embodiments (not shown in the figures), the top cover and the device cover are not limited to the detachable connection by clamping, but can also be set as screw connection, pin connection, rivet connection and any desired connection mode.

In this embodiment, the top cover 3017 is provided with a weight block 3020, wherein the top cover 3017 is formed with a receiving part 3021, and the weight block 3020 is arranged in the receiving part 3021. When the device tilts to pour out liquid, the end of the top cover 3017 with the weight block 3020 sinks due to the traction of the weight block 3020, and the end of the top cover 3017 far away from the weight block 3020 tilts up, thus realizing the automatic opening of the top cover 3017 when the device pours out liquid.

As shown in FIG. 5, in this embodiment, the device cover 2000 is provided with a liquid outlet 2002 corresponding to the fluid channel and a liquid outlet nozzle 3022 corresponding to the liquid outlet 2002, which communicates with the fluid channel, and a cover nozzle 3023 corresponding to the liquid outlet nozzle 3022 is formed on the device cover 2000; a first fixing groove 3024 is arranged on the liquid outlet nozzle 3022, a second fixing groove 3025 corresponding to the first fixing groove 3024 is arranged on the device cover 2000, and a fixing ring 3026 corresponding to the first fixing groove 3024 and the second fixing groove 3025 is arranged between the liquid outlet nozzle 3022 and the device cover 2000; and the liquid outlet nozzle 3022 and the device cover 2000 are detachably connected through the first fixing groove 3024, the second fixing groove 3025 and the fixing ring 3026.

In this embodiment, the liquid outlet nozzle 3022 and the device cover 2000 are detachably connected through the first fixing groove 3024, the second fixing groove 3025 and the fixing ring 3026. In other embodiments (not shown in the figures), the liquid outlet nozzle and the device cover are not limited to being detachably connected by the first fixing groove, the second fixing groove and the fixing ring, but also can be connected by screws, pins, rivets, welding and any other desired connection methods.

As shown in FIGS. 2 to 5, in this embodiment, an air inlet pipe 3027 is provided on the device cover 2000, wherein the air inlet pipe 3027 communicates with the fluid channel 2001. The air inlet pipe 3027 can balance the internal pressure of the device when pouring liquid, making the liquid discharging process smoother.

As shown in FIGS. 2 and 3, in this embodiment, the second liquid storage cavity 3003 is provided with a second clamping block 3028, and the first liquid storage cavity 3002 is provided with a second clamping groove 3029 corresponding to the second clamping block 3028, so that the first liquid storage cavity 3002 and the second liquid storage cavity 3003 are detachably connected by clamping.

In this embodiment, the first liquid storage cavity 3002 and the second liquid storage cavity 3003 are detachably connected by clamping. In other embodiments (not shown in the figures), the first liquid storage cavity and the second liquid storage cavity are not limited to being detachably connected by clamping, but can also be connected by screws, pins, rivets, welding and any other desired connection methods.

As shown in FIG. 1, in this embodiment, a handle 3030 is provided on the device cover 2000. In some embodiments, the handle 3030 is also provided with an anti-skid pad, anti-skid lines and a shape that conforms to the grip of a human hand.

As shown in FIG. 1, in this embodiment, the accommodating cavity 1001 has an outer surface corresponding to the inner surface, and anti-skid lines 3031 are provided on the outer surface. In other embodiments (not shown in the figures), the outer surface is not limited to being provided with anti-skid lines, but also provided with scales, patterns and anti-skid pads.

As shown in FIGS. 2 and 3, in this embodiment, at least one limiting edge 3032 corresponding to the first valve body 3007 is provided in the fluid channel 2001. The limiting edge 3032 is used to prevent the first valve body 3007 from blocking the liquid outlet 2002, so that the liquid outlet process is smoother.

As shown in FIGS. 2 to 6, in this embodiment, an external thread 3033 is provided on the accommodating cavity 1001 and an internal thread 3034 is provided on the device cover 2000, and the accommodating cavity 1001 and the device cover 2000 are detachably connected by threads.

In this embodiment, the accommodating cavity 1001 and the device cover 2000 are detachably connected by threads. In other embodiments (not shown in the figures), the accommodating cavity and the device cover are not limited to being detachably connected by threads, but can also be arranged as screw connection, pin connection, rivet connection, welding, snap connection and any desired connection mode.

Figure 6:
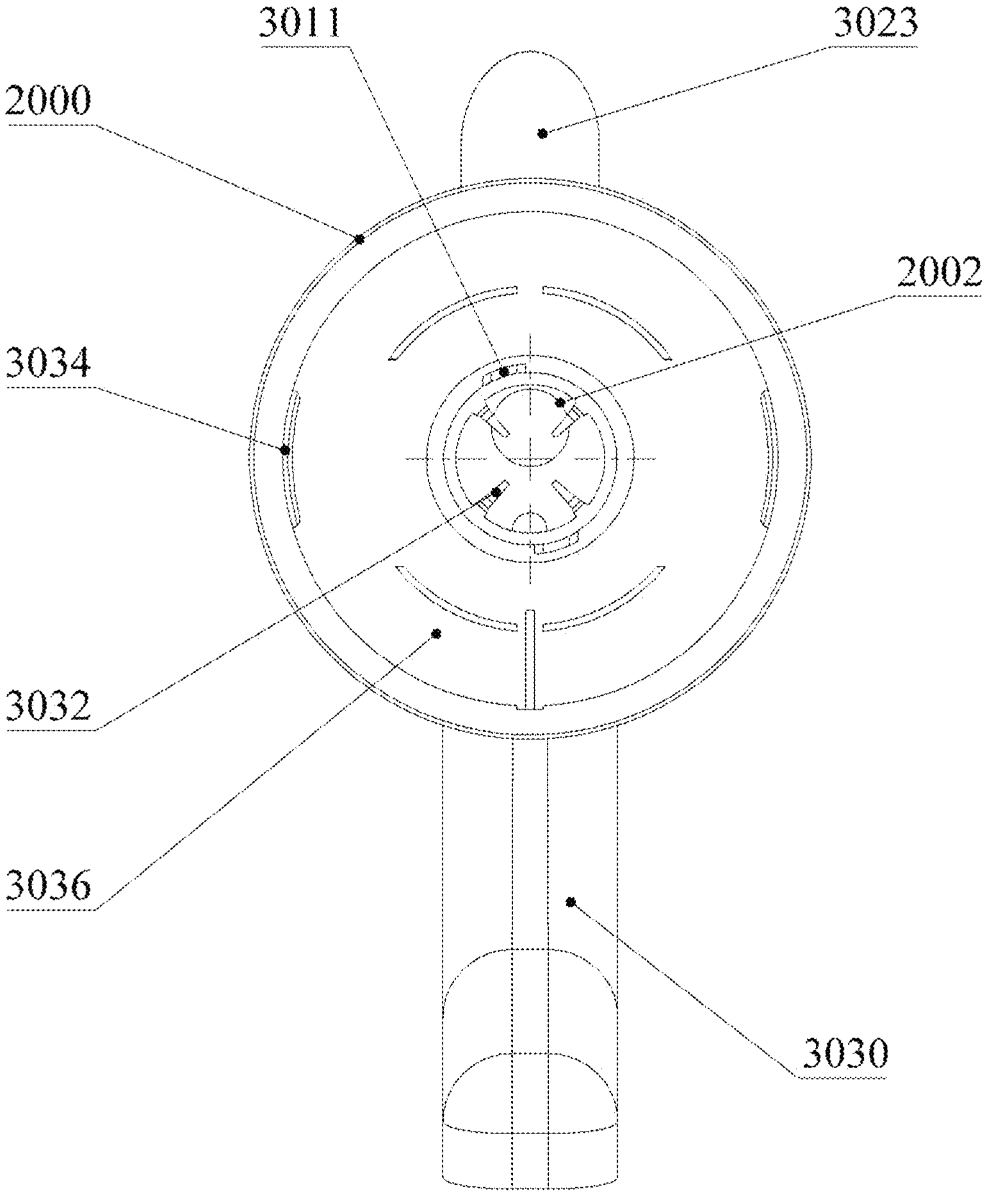
FIG. 6 is a schematic bottom view of the device cover.

As shown in FIGS. 4 to 6, in this embodiment, the device cover 2000 is provided with a second sealing ring 3035 and a sealing groove 3036 corresponding to the second sealing ring 3035. The arrangement of the second sealing ring 3035 increases the sealing property of the device, so that the device 1000 is closed relative to the outside, and only the fluid channel is a channel communicating with the outside.

As shown in FIG. 2, in this embodiment, the bottom of the accommodating cavity 1001 is provided with a bottom groove 1002, which can help the device to keep stable. When the surface on which the device is placed is uneven, the periphery of the bottom groove 1002 contacts the ground, thus reducing the contact area with the uneven surface.

Figure 7:
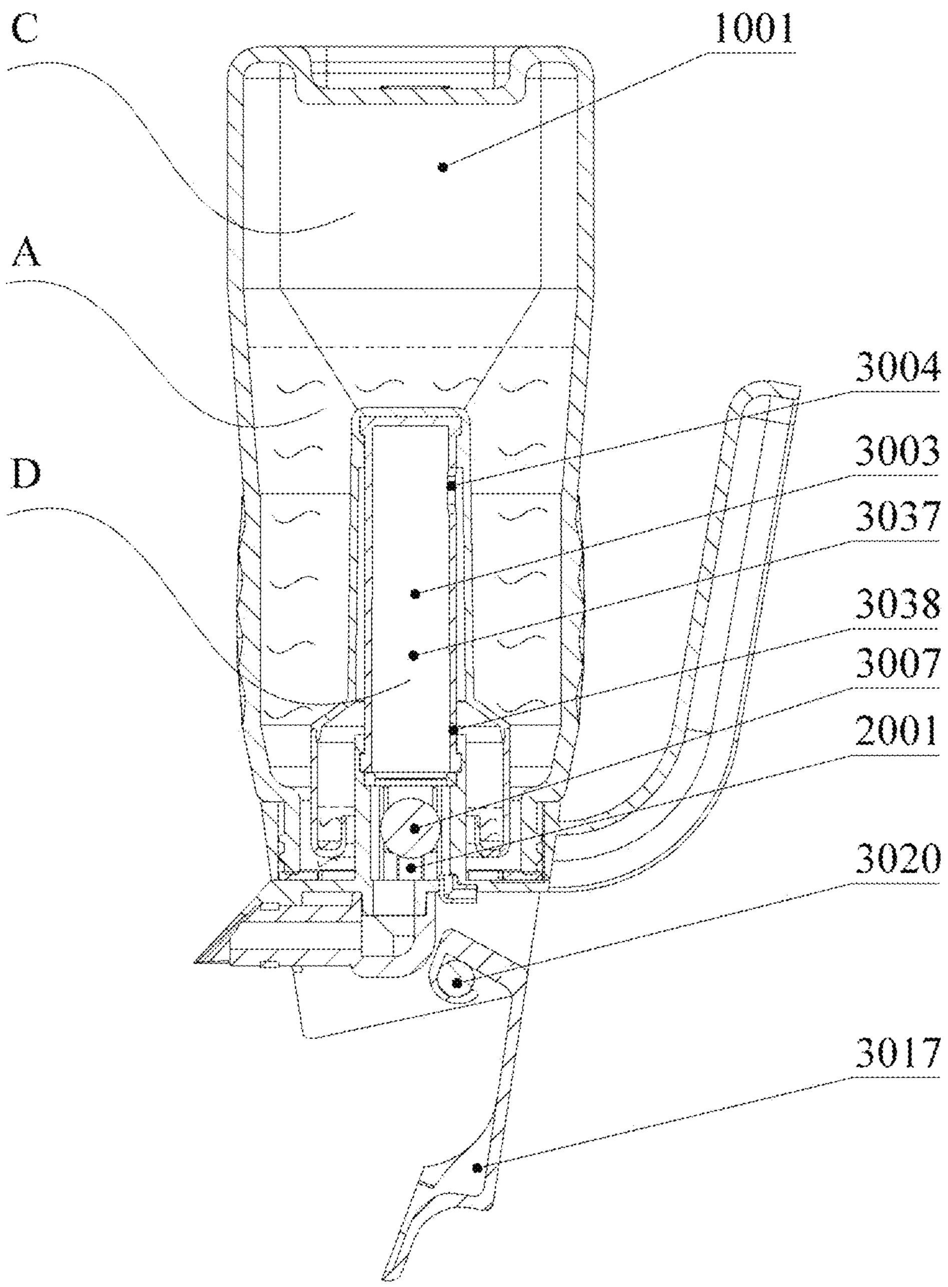
FIG. 7 is a schematic diagram of the device when it is inverted.
Figure 8:
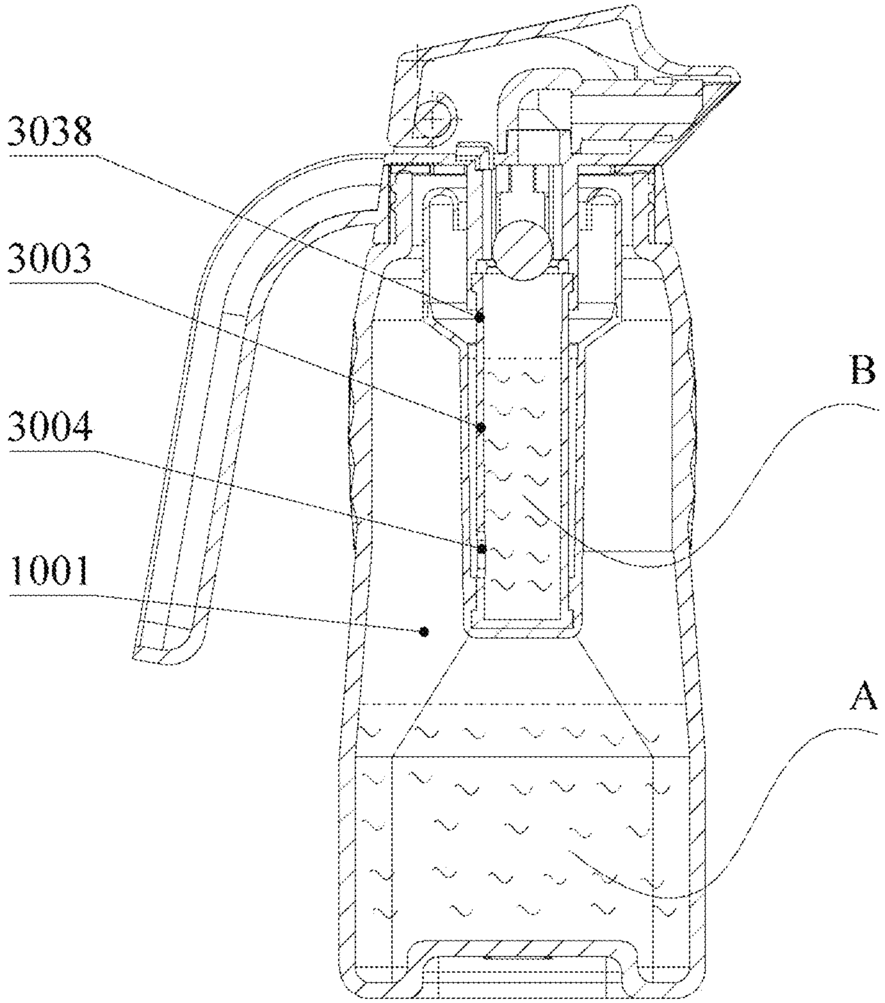
FIG. 8 is a schematic diagram of the device when it is put in the upright position.

As shown in FIGS. 7 to 8, when the device 1000 is placed upright, the accommodating cavity 1001 is only in air communication with the first liquid storage cavity 3002, and the air pressure of the two cavities is the same. The first liquid storage cavity 3002 and the second liquid storage cavity 3003 are connected by a liquid inlet hole 3004 to form a communication device structure, and the liquid levels of the two cavities are equal.

When the device 1000 is inverted, the quantitative liquid B in the second liquid storage cavity 3003 flows out under the action of gravity; the liquid in the second liquid storage cavity 3003 falls; the second liquid storage cavity 3003 is in air communication with the first liquid storage cavity 3002, and the air pressure is the same; the liquid in the accommodating cavity 1001 falls down and forms a communication structure with the second liquid storage cavity 3003. According to the communicating vessel principle, if the air pressures of the accommodating cavity 1001 and the second liquid storage cavity 3003 are equal, the liquid levels of the accommodating cavity 1001 and the second liquid storage cavity 3003 will tend to be equal. However, at this time, the accommodating cavity 1001 is closed, and the liquid in the accommodating cavity 1001 is subjected to gravity, so that the air pressure above the liquid level of the accommodating cavity 1001 is increased. When the gravity of the liquid in the accommodating cavity 1001 is balanced with the atmospheric pressure of the second liquid storage cavity 3003, the liquid levels in the accommodating cavity 1001 and the second liquid storage cavity 3003 are balanced, and the liquid in the accommodating cavity 1001 will not flow out through the second liquid storage cavity 3003 and the first liquid storage cavity 3002.

When the device 1000 is restored to the normal state, the liquid A in the accommodating cavity 1001 falls back to the cavity bottom, and due to the atmospheric pressure, air enters the second liquid storage cavity 3003 and the accommodating cavity 1001 from the first liquid storage cavity 3002 through the air outlet hole 3038; in addition, due to the action of gravity, the liquid in the second liquid storage cavity 3003 falls back, and part of it enters the first liquid storage cavity 3002 through the liquid inlet hole 3004, forming a communicating vessel structure.

Figure 9:
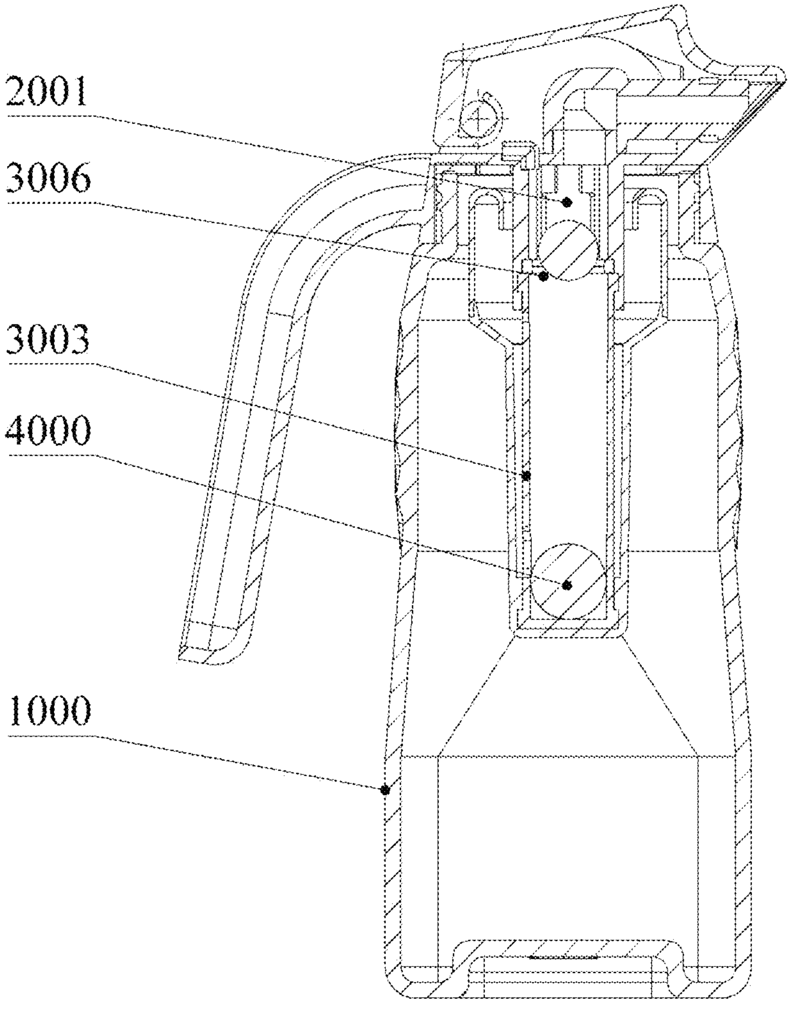
FIG. 9 is a schematic diagram of another embodiment of the dumping-type automatic quantitative liquid discharging device.

As shown in FIG. 9, it is another embodiment of the dumping-type automatic quantitative liquid discharging device provided by the present invention, which is different from the above-mentioned embodiment in that a second valve body 4000 is arranged in the second liquid storage cavity 3003, which is rollably arranged in the second liquid storage cavity 3003 and closely adheres to the second liquid storage cavity 3003 for blocking; when the device is tilted to discharge the liquid in the second liquid storage cavity 3003 through the fluid channel 2001, the second valve body 4000 is used to abut against the inner wall surface of the upper end of the second liquid storage cavity 3003 to block the liquid storage outlet 3006.

In this embodiment, the second valve body 4000 further improves the airtightness of the device, and when the device pours liquid, the liquid in the device 1000 will not communicate with the outside world, further preventing volatilization and deterioration.

The present invention provides a quantitative liquid discharging method, which includes providing a dumping-type automatic quantitative liquid discharging device, wherein dumping-type automatic quantitative liquid discharging device comprises an accommodating cavity for accommodating liquid, a first liquid storage cavity and a second liquid storage cavity for storing quantitative liquid, and a fluid channel;

wherein, the fluid channel sequentially communicates with the accommodating cavity, the first liquid storage cavity and the second liquid storage cavity, and defines a path for air and the quantitative liquid to enter and leave the device; and wherein, the first liquid storage cavity and the second liquid storage cavity are arranged at one end of the accommodating cavity; when the device pours out liquid, the quantitative liquid stored in the second liquid storage cavity leaves the device through the fluid channel, and an atmospheric low pressure area is formed at the other end of the accommodating cavity; and an atmospheric normal pressure area is formed in the first liquid storage cavity and the second liquid storage cavity, so that the liquid is confined between the first liquid storage cavity and the accommodating cavity; and wherein the second liquid storage cavity captures and stores a part of the liquid to become new the quantitative liquid; and wherein, when the device is reset, the quantitative liquid stored in the second liquid storage cavity will be received and stored by the first liquid storage cavity; and pouring liquid into the accommodating cavity; and connecting the device cover with the accommodating cavity; and tilting the dumping-type automatic quantitative liquid discharging device to allow the quantitative liquid to flow out.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A dumping-type automatic quantitative liquid discharging device, comprising: an accommodating cavity for accommodating liquid, a first liquid storage cavity and a second liquid storage cavity for storing quantitative liquid, and a fluid channel; and wherein, said fluid channel sequentially communicates with said accommodating cavity, said first liquid storage cavity and said second liquid storage cavity, and defines a path for air and said quantitative liquid to enter and leave said device; and wherein, said first liquid storage cavity and said second liquid storage cavity are arranged at one end of said accommodating cavity; and when said device pours out liquid, the quantitative liquid stored in said second liquid storage cavity leaves said device through said fluid channel, and an atmospheric low pressure area is formed at the other end of said accommodating cavity; and an atmospheric normal pressure area is formed in said first liquid storage cavity and said second liquid storage cavity, so that said liquid is confined between said first liquid storage cavity and said accommodating cavity; and wherein said second liquid storage cavity captures and stores a part of said liquid to become new said quantitative liquid; and wherein, when said device is reset, said quantitative liquid stored in said second liquid storage cavity will be received and stored by said first liquid storage cavity.

2. The dumping-type automatic quantitative liquid discharging device according to claim 1, wherein a sum of volumes of said first liquid storage cavity and said second liquid storage cavity is smaller than a volume of said accommodating cavity, and said second liquid storage cavity further comprises a liquid storage part which captures and stores a part of said liquid to become new said quantitative liquid; and said second liquid storage cavity further comprises a liquid storage outlet, and a first valve body corresponding to said liquid storage outlet is arranged in said fluid channel, and when said device is in a vertical state, said first valve body blocks said liquid storage outlet; and when said device pours out liquid, said first valve body is far away from said liquid storage outlet; and wherein, a first sealing ring is arranged on the liquid storage outlet, and a sealing opening corresponding to said first valve body is arranged on said first sealing ring.

3. The dumping-type automatic quantitative liquid discharging device according to claim 2, wherein a second valve body is arranged in said second liquid storage cavity, and said second valve body is rollably arranged in said second liquid storage cavity and closely adheres to said second liquid storage cavity for blocking.

4. The dumping-type automatic quantitative liquid discharging device according to claim 1, wherein said first liquid storage cavity is provided with a liquid storage retaining ring, and said liquid storage retaining ring is formed with a liquid retaining part bent inward; and wherein, a clamping ring is arranged on said first liquid storage cavity, a ring groove is arranged on said liquid storage retaining ring, and said first liquid storage cavity and said liquid storage retaining ring are detachably connected by clamping.

5. The dumping-type automatic quantitative liquid discharging device according to claim 2, wherein an embedding groove is arranged at a bottom of said fluid channel, and the liquid storage outlet of said second liquid storage cavity and said first sealing ring are arranged in said embedding groove, and wherein, said embedding groove is provided with a first clamping groove, said second liquid storage cavity is provided with a first clamping block corresponding to said first clamping groove, and said fluid channel and said first liquid storage cavity are detachably connected by clamping; and wherein, a second clamping block is arranged on said second liquid storage cavity, a second clamping groove corresponding to said second clamping block is arranged on said first liquid storage cavity, and said first liquid storage cavity and said second liquid storage cavity are detachably connected by clamping.

6. A dumping-type automatic quantitative liquid discharging device, comprising: an accommodating cavity for accommodating liquid, a first liquid storage cavity and a second liquid storage cavity for storing quantitative liquid, and a fluid channel; and wherein, said fluid channel sequentially communicates with said accommodating cavity, said first liquid storage cavity and said second liquid storage cavity, and defines a path for air and said quantitative liquid to enter and leave said device; and wherein a sum of volumes of said first liquid storage cavity and said second liquid storage cavity is smaller than a volume of said accommodating cavity, and said second liquid storage cavity further comprises a liquid storage part; and wherein, said first liquid storage cavity and said second liquid storage cavity are arranged at one end of said accommodating cavity; and when said device pours out liquid, said quantitative liquid stored in said second liquid storage cavity leaves said device through said fluid channel; and an atmospheric low pressure area is formed at the other end of said accommodating cavity, and an atmospheric normal pressure area is formed in said first liquid storage cavity and said second liquid storage cavity, so that said liquid is confined between said first liquid storage cavity and said accommodating cavity; and wherein said liquid storage part captures and stores a part of said liquid to become new said quantitative liquid; and wherein, when said device is reset, said quantitative liquid stored in said second liquid storage cavity will be received and stored by said first liquid storage cavity.

7. The dumping-type automatic quantitative liquid discharging device according to claim 6, wherein said second liquid storage cavity further comprises a liquid storage outlet, and a first valve body corresponding to said liquid storage outlet is arranged in said fluid channel; and when said device is in a vertical state, said first valve body blocks said liquid storage outlet; and when said device pours liquid, said first valve body is far away from said liquid storage outlet, wherein a first sealing ring is arranged on said liquid storage outlet, and a sealing opening corresponding to said first valve body is arranged on said first sealing ring; and wherein said second liquid storage cavity is provided with a liquid inlet hole and an air outlet hole.

8. The dumping-type automatic quantitative liquid discharging device according to claim 7, wherein an embedding groove is arranged at a bottom of said fluid channel, and said liquid storage outlet of said second liquid storage cavity and said first sealing ring are arranged in said embedding groove; and wherein, said embedding groove is provided with a first clamping groove, said second liquid storage cavity is provided with a first clamping block corresponding to said first clamping groove, and said fluid channel and said first liquid storage cavity are detachably connected by clamping.

9. The dumping-type automatic quantitative liquid discharging device according to claim 6, wherein said first liquid storage cavity is provided with a liquid storage retaining ring, and said liquid storage retaining ring is formed with a liquid retaining part bent inward; and wherein, a clamping ring is arranged on said first liquid storage cavity, a ring groove is arranged on said liquid storage retaining ring, and said first liquid storage cavity and said liquid storage retaining ring are detachably connected by clamping.

10. The dumping-type automatic quantitative liquid discharging device according to claim 6, wherein said device comprises a device cover fixedly connected with said accommodating cavity, and said device cover is provided with a top cover, a rotating column is arranged on said device cover, and a rotating groove corresponding to said rotating column is arranged on said top cover, and said top cover is rotatably connected with said device cover; and wherein, a weight block is arranged on said top cover, wherein said top cover is formed with an accommodating part, and said weight block is arranged in said accommodating part.

11. The dumping-type automatic quantitative liquid discharging device according to claim 10, wherein a liquid outlet corresponding to said fluid channel and a liquid outlet nozzle corresponding to said liquid outlet are arranged on said device cover, and said liquid outlet nozzle is communicated with said fluid channel, and a cover nozzle corresponding to said liquid outlet nozzle is formed on said device cover; and wherein, said liquid outlet nozzle is provided with a first fixing groove, said device cover is provided with a second fixing groove corresponding to said first fixing groove, and a fixing ring corresponding to said first fixing groove and said second fixing groove is arranged between said liquid outlet nozzle and said device cover; and said liquid outlet nozzle and said device cover are detachably connected through said first fixing groove, said second fixing groove and said fixing ring.

12. The dumping-type automatic quantitative liquid discharging device according to claim 7, wherein a second valve body is arranged in said second liquid storage cavity, and said second valve body is rollably arranged in said second liquid storage cavity and closely adheres to said second liquid storage cavity for blocking.

13. The dumping-type automatic quantitative liquid discharging device according to claim 6, wherein an air inlet pipe is arranged on said device, and said air inlet pipe is communicated with said fluid channel.

14. The dumping-type automatic quantitative liquid discharging device according to claim 7, wherein a second clamping block is arranged on said second liquid storage cavity, and a second clamping groove corresponding to said second clamping block is arranged on said first liquid storage cavity, and said first liquid storage cavity and said second liquid storage cavity are detachably connected by clamping.

15. The dumping-type automatic quantitative liquid discharging device according to claim 10, wherein a handle part is arranged on said device cover.

16. The dumping-type automatic quantitative liquid discharging device according to claim 6, wherein said accommodating cavity is provided with anti-skid lines.

17. The dumping-type automatic quantitative liquid discharging device according to claim 7, wherein at least one limiting edge corresponding to said first valve body is arranged in said fluid channel.

18. The dumping-type automatic quantitative liquid discharging device according to claim 10, wherein external threads are arranged on said accommodating cavity and internal threads are arranged on said device cover, and said accommodating cavity and said device cover are detachably connected through threads.

19. The dumping-type automatic quantitative liquid discharging device according to claim 10, wherein a second sealing ring and a sealing groove corresponding to said second sealing ring are arranged on said device cover.

20. A quantitative liquid discharging method, comprising providing a dumping-type automatic quantitative liquid discharging device, wherein dumping-type automatic quantitative liquid discharging device comprises an accommodating cavity and a device cover for accommodating liquid, a first liquid storage cavity and a second liquid storage cavity for storing quantitative liquid, and a fluid channel; and wherein, said fluid channel sequentially communicates with said accommodating cavity, said first liquid storage cavity and said second liquid storage cavity, and defines a path for air and said quantitative liquid to enter and leave said device; and wherein, said first liquid storage cavity and said second liquid storage cavity are arranged at one end of said accommodating cavity; and when said device pours out liquid, the quantitative liquid stored in said second liquid storage cavity leaves said device through said fluid channel, and an atmospheric low pressure area is formed at the other end of said accommodating cavity; and an atmospheric normal pressure area is formed in said first liquid storage cavity and said second liquid storage cavity, so that said liquid is confined between said first liquid storage cavity and said accommodating cavity; and wherein said second liquid storage cavity captures and stores a part of said liquid to become new said quantitative liquid; and wherein, when said device is reset, said quantitative liquid stored in said second liquid storage cavity will be received and stored by said first liquid storage cavity; and pouring liquid into said accommodating cavity; and connecting said device cover with said accommodating cavity; and tilting said dumping-type automatic quantitative liquid discharging device to allow the quantitative liquid to flow out.

* * * * *